United States Patent
Ignatius et al.

(10) Patent No.: US 6,542,972 B2
(45) Date of Patent: Apr. 1, 2003

(54) LOGICAL VIEW AND ACCESS TO PHYSICAL STORAGE IN MODULAR DATA AND STORAGE MANAGEMENT SYSTEM

(75) Inventors: Paul Ignatius, Jackson, NJ (US); Marjorie H. Theisen, Lakewood, CO (US); David Alan Oshinsky, East Brunswick, NJ (US); Srinivas Kavuri, Highland Park, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

(21) Appl. No.: 09/774,268

(22) Filed: Jan. 30, 2001

(65) Prior Publication Data

US 2001/0034812 A1 Oct. 25, 2001

Related U.S. Application Data

(60) Provisional application No. 60/179,344, filed on Jan. 31, 2000.

(51) Int. Cl.[7] .............................................. G06F 12/00
(52) U.S. Cl. ................. 711/154; 711/104; 711/161; 714/13; 707/10; 707/103
(58) Field of Search ................. 711/104, 161, 711/154; 714/13; 707/10, 103

(56) References Cited

U.S. PATENT DOCUMENTS

| | | | |
|---|---|---|---|
| 5,005,122 A | 4/1991 | Griffin et al. | 709/203 |
| 5,212,772 A | 5/1993 | Masters | 714/20 |
| 5,287,500 A | * 2/1994 | Stoppani, Jr. | 711/211 |
| 5,321,816 A | 6/1994 | Rogan et al. | 705/42 |
| 5,448,724 A | 9/1995 | Hayashi | 714/4 |
| 5,491,810 A | 2/1996 | Allen | 711/117 |
| 5,504,873 A | * 4/1996 | Martin et al. | 711/111 |
| 5,673,381 A | 9/1997 | Huai et al. | 714/1 |
| 5,813,009 A | 9/1998 | Johnson et al. | 707/100 |
| 5,950,205 A | 9/1999 | Aviani, Jr. | 707/103 R |
| 6,021,415 A | 2/2000 | Cannon et al. | 707/206 |
| 6,131,095 A | 10/2000 | Low et al. | 707/10 |
| 6,161,111 A | 12/2000 | Mutalik et al. | 707/205 |
| 6,292,783 B1 | 9/2001 | Rohler et al. | 705/2 |
| 6,330,572 B1 | * 12/2001 | Sitka | 707/205 |

FOREIGN PATENT DOCUMENTS

| | | |
|---|---|---|
| EP | 0259 912 A | 3/1988 |
| EP | 0 467 546 A | 1/1992 |
| EP | 0 774 715 A | 5/1997 |
| EP | 0 809 184 A | 11/1997 |
| EP | 0 899 662 A | 3/1999 |
| WO | WO 95 13580 A | 5/1995 |

OTHER PUBLICATIONS

PCT Written Opinion dated Oct. 24, 2001.
PCT International Preliminary Examination Report.
Luis–Felipe Cabrera, et al: "ADSM: A Multi–Platform, Scalable, Backup and Archive Mass Storage System", Digest of Papers of the Computer Society Computer Conference (Spring) Compcon, US, Los Alamitos, IEEE Comp. Soc. Press, vol. Conf. (Mar. 5, 1995), pp. 420–427.
Jander, M.: "Launching Storage–Area Net", Data Communications, US, McGraw Hill, NY, vol. 27, No. 4 (Mar. 21, 1988), pp. 64–72.

* cited by examiner

*Primary Examiner*—Do Hyun Yoo
*Assistant Examiner*—Mehdi Namari
(74) *Attorney, Agent, or Firm*—Brown Raysman Millstein Felder & Steiner, LLP (57) ABSTRACT

A computer storage system having a processor that supports operation of at least one software application in order to store selected data in the computer storage system, at least one storage media for storing the selected data, a plurality of storage policies, each having particular storage guidelines, that are available to determine how data is to be stored in the computer storage system, and a storage control that interacts with the at least one software application of the processor to determine which of the plurality of storage policies to use for storage of the selected data and that stores the selected data according to the selected storage policy. In one embodiment, the storage control of the computer storage system migrates the selected data from one of the at least one storage media to another of the at least one storage media according to the selected storage policy.

12 Claims, 9 Drawing Sheets

Storage Sequences

| Storage Name | 1st Storage ID | Duration (weeks) | 2nd Storage ID | Duration (weeks) | 3rd Storage ID | Duration (weeks) | ... | Nth Storage ID |
|---|---|---|---|---|---|---|---|---|
| Primary | 001 | 13 | 005 | 26 | 002 | 52 | | 004 |
| Secondary | 005 | 13 | 003 | 13 | 002 | 65 | | 004 |
| Duplicate | 001 | 13 | | | | | | |
| | 005 | 39 | 002 | 26 | | | | 004 |
| Long Term | 005 | 2 | 002 | 12 | | | | 004 |

LOGICAL VIEW AND ACCESS TO PHYSICAL STORAGE IN MODULAR DATA AND STORAGE MANAGEMENT SYSTEM

CROSS-REFERENCE TO RELATED APPLICATION

The present application claims the benefit of U.S. Provisional Application Ser. No. 60/179,344, filed Jan. 31, 2000, pending, which is hereby incorporated by reference herein in its entirety.

BACKGROUND

1. Field of the Invention

The present invention generally relates to data storage in computer systems and more particularly to the logical view and access to physical storage in a modular data and storage management system.

2. Description of the Related Art

Existing storage systems require an end user to know and define exactly where data needs to be written and deposited in the storage system. This type of storage system is very hard to use and inherently unscalable as the user's data grows since the user will not be able to keep track of every storage device in the system. More importantly, every time new storage device(s) are added to the environment, the user will have to redefine how and where archival or backup data needs to be stored.

Many other problems and disadvantages of the prior art will become apparent to one skilled in the art after comparing such prior art with the present invention as described herein.

SUMMARY

Various aspects of the present invention may be realized through a computer storage system that includes a processor that supports operation of at least one software application that may be utilized to generate data that is stored in the computer storage system. The computer storage system also includes at least one storage media for storing selected data from the data that is generated. A plurality of storage policies are included where each one of the plurality of storage policies includes directions that the processor must follow for storage of data on the at least one storage media. A storage control interacts with the at least one software application of the processor to select one of the plurality of storage policies and to determine, according to the selected one of the plurality of storage policies, which of the at least one storage media to use for storage of the selected data.

In certain embodiments, the at least one storage media of the computer storage system includes a plurality of storage media, e.g., magnetic tape media, magnetic disk media, optical medial, or other suitable storage media familiar to those skilled in the art. The storage control of the computer storage system may include a manager module that interacts with a media module to compile an index to track the location of the selected data in the at least one storage media. The storage control is often configured to migrate the selected data among the at least one storage media according to the selected one of the plurality of storage policies. The plurality of storage policies may be storage sequences, storage logic, initial storage sequence selection criteria, storage sequence reselection criteria, storage sequence adaptation criteria, etc. The initial storage sequence selection criteria are commonly user directed override, user profile, application, file type, user network location, and available storage space or similar criteria. The storage sequence reselection criteria are criteria such as specific file usage history, file type usage history, user profile, user network relocation, available storage space, added storage media, etc. Finally, the storage sequence adaptation criteria are items such as specific file usage history, user profile, user network relocation, available storage space, added storage media, or other suitable criteria that becomes apparent to those of ordinary skill in the art and viewing the present disclosure.

Various aspects of the present invention may also be realized by a computer storage system having a processor that supports operation of at least one software application in order to store selected data in the computer storage system, at least one storage media for storing the selected data, a plurality of storage policies, each having particular storage guidelines, that are available to determine how data is to be stored in the computer storage system, and a storage control that interacts with the at least one software application of the processor to determine which of the plurality of storage policies to use for storage of the selected data and that stores the selected data according to the selected storage policy. In one embodiment, the storage control of the computer storage system migrates the selected data from one of the at least one storage media to another of the at least one storage media according to the selected storage policy.

Still other aspects of the present invention are realized through a method for storing data on one of a plurality of storage media of a computer storage system according to one of a plurality of storage policies that are defined by a user. The method involves, not necessarily in this order directing a software application to store selected data; examining the selected data for particular characteristics; selecting a particular storage policy that matches the particular characteristics of the selected data; and storing the selected data on a storage media of the computer storage system according to the particular storage policy.

The method may also include migrating the selected data among the plurality storage media according to the particular storage policy.

Other aspects of the present invention will become apparent with further reference to the drawings and specification which follow.

DETAILED DESCRIPTION OF THE DRAWINGS

An exemplary description of the principles according to the present invention may be found in a storage policy where logical data buckets are presented to the end user for directing their data storage operations such as backup and archival. Storage policy is a logical concept. Each storage policy comprises one or more copies. Each copy is a self-contained unit of information. A primary copy indicates the default destination of storage operations and is tied to a practical set of drives, e.g., physical drives. Drives are addressed independently of the library or media agent that they are attached to. Storage policy at the same time comprises of a multiple number of streams which indicate the number of active drives that the storage operation can run against, allowing parallelism in data transfer. A single copy backup may always be run which transfers data to the primary copy. The primary copy may then be replicated to the secondary copies or a multiple copy simultaneous backup may be performed.

Each copy could have its destination media type different to allow storage policies to hide media type and related problems in a clean abstract interface. It also takes care of keeping track of which copy resides where, what is size of each data, etc. In this manner, the user's data is protected as well as presented in an abstract way using storage policies. Each of the copies of storage policy could be governed with different aging rules for the application's data. For example, the primary copy could be targeted to magnetic disc and aged every 30 days and secondary copy could be targeted to tape and aged every year. Data read operation will always fetch it from the optimal solution for retrieval.

In one embodiment of the present invention, the user just has to define a "Storage Policy" which defines where, how, and the duration the data should be stored at a higher level of abstraction without having to have intimate knowledge of the underlying storage and technology. The management of the details of data storage is transparent to the user.

Figure 1:
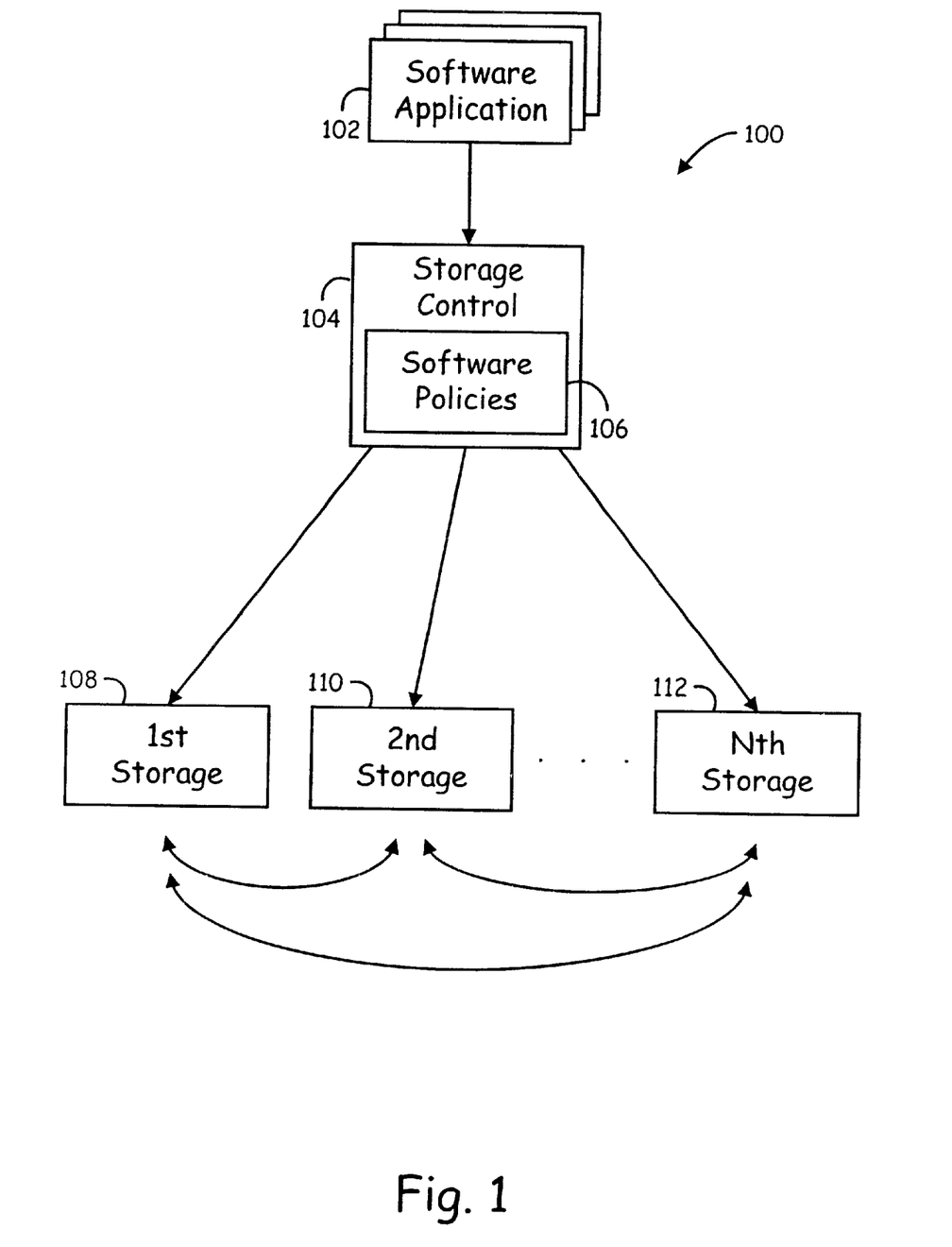
FIG. 1 is a block diagram of an exemplary embodiment of a storage system that operates according to principles of the present invention.

FIG. 1 is a block diagram of an exemplary embodiment of a storage system 100 that operates according to principles of the present invention. The storage system 100 includes software applications 102 that a user interacts with to store data to various storage media. The software applications 102 communicate with a storage control 104 that determines where to store data from the software applications 102 according to storage policies 106. The storage control 104 typically receives data that is to be stored from the software applications 102. Upon receipt of data from the software applications 102, the storage control 104 determines whether to store the data in a first storage media 108, a second storage media 110, or any number of other storage media down to an Nth storage media 112. The storage control 104 controls which storage media the data will be stored to as well as where data that has been previously stored will be moved to.

For example, the storage control 104 may move data that has been stored in the first storage media 108 into the second storage media 110 based on certain storage policies 106. In addition, the storage control 104 could move data from the second storage media 110 to any other of the storage media including the Nth storage media 112. Also, the storage control 104 could move data from the first storage media 108 into the Nth storage media 112. Of course, the data could be moved in either direction, i.e., the storage control 104 is capable of moving data between storage media.

Figure 2:
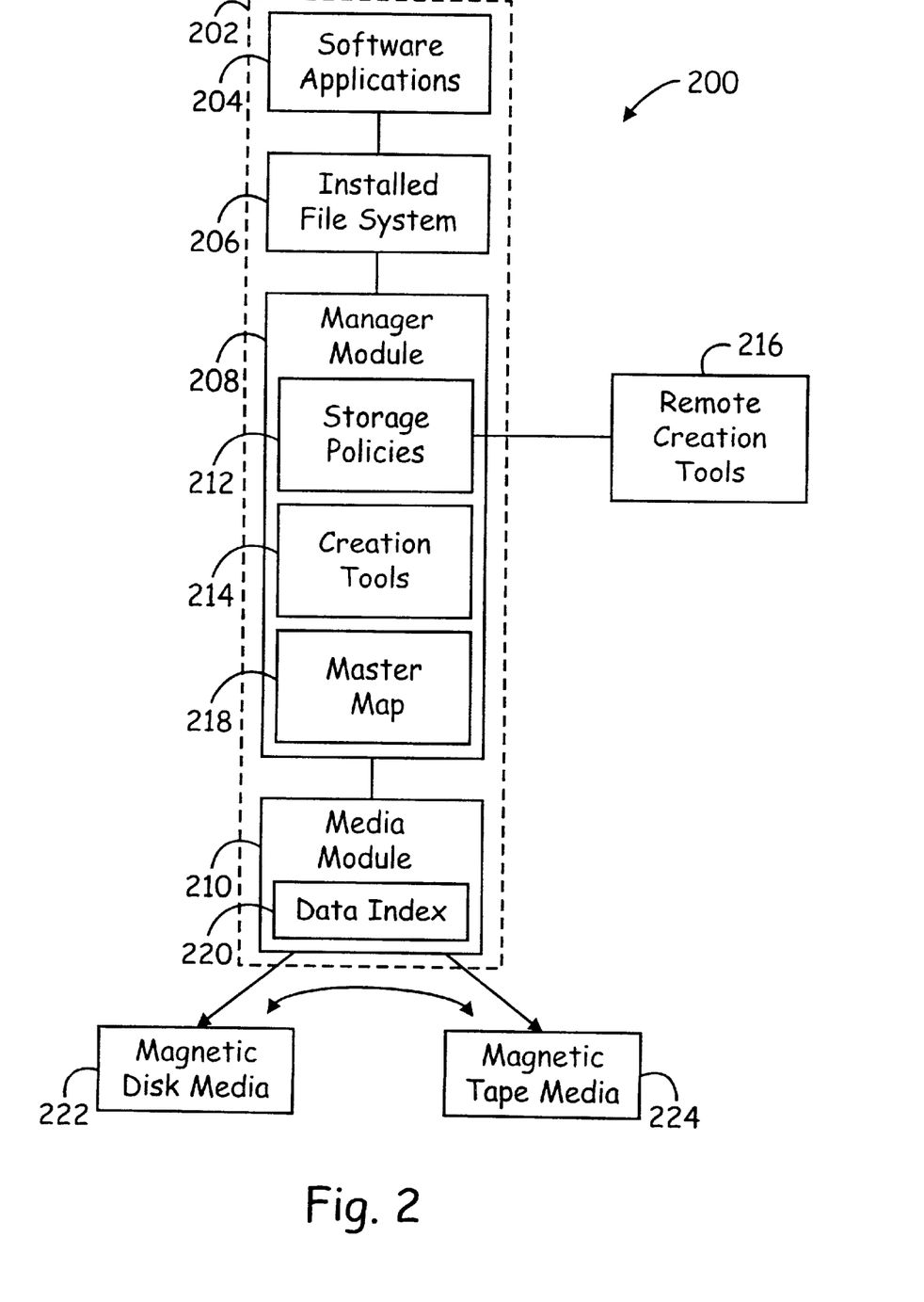
FIG. 2 is a block diagram of an exemplary storage system illustrated in greater detail than the storage system of FIG. 1.

FIG. 2 is a block diagram of an exemplary storage system 200 illustrated in greater detail than the storage system 100. The storage system 200 includes a single computing device 202 to carry out operations of the storage system 200. The computing device 202 includes a software application 204 that interacts with an installed file system 206 when a user desires to transfer data from the software application 204 to the storage media. For example, when a user saves data from the software application 204, the user is only aware that the data is being saved to the installed file system 206. The installed file system 206 interacts with a manager module 208, which in turn interacts with a media module 210.

The manager module 208 includes storage policies 212. The storage policies 212 determine how data that the manager module 208 received from the installed file system 206 will be stored in the storage media. The storage policies 212 interact with creation tools 214 to create the appropriate storage scenario for the data that the manager module 208 has received from the installed file system 206. The creation tools 214 may be accessed directly in the manager module 208, or remotely, as illustrated by remote creation tools 216. The manager module 208 also includes a master map 218 to assist in initial storage decisions in the storage media.

The media module 210 includes a data index 220 that includes further details of where the data is to be stored in the storage system 200. The data index 220 includes details such as the location of magnetic disc media 222 and magnetic tape media 224. The data index 220 is updated with file location information when any data is moved from one storage media to another such as from the magnetic disc media 222 to the magnetic tape unit 224. Of Course, additional types and more than one type of storage media could be incorporated into the storage system 200.

Figure 3:
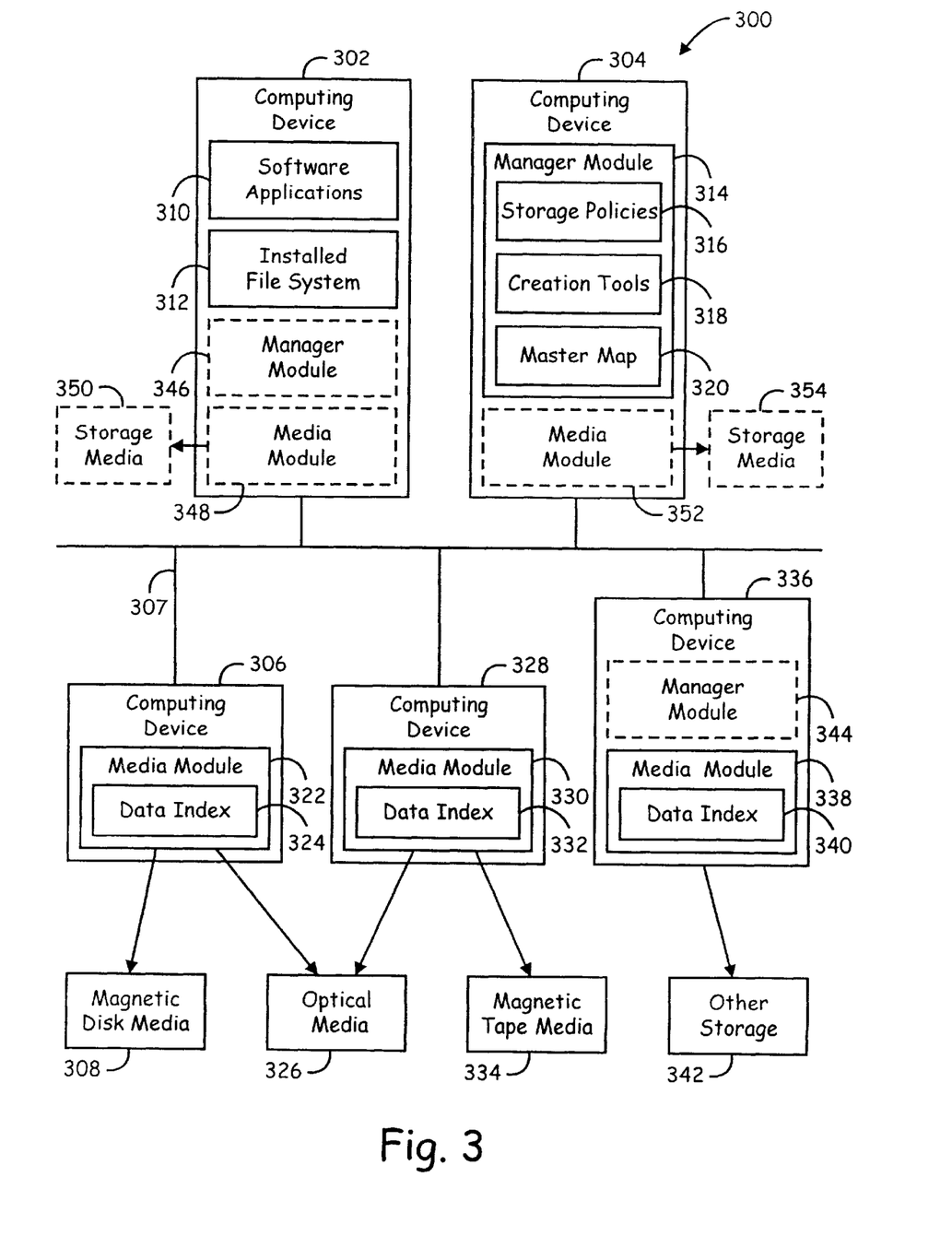
FIG. 3 is a block diagram of another exemplary storage system that is illustrated in greater detail than the storage system of FIG. 1.

FIG. 3 is a block diagram of another exemplary storage system 300 that is illustrated in greater detail than the storage system 100. The storage system 300 includes a computing device 302, a computing device 304, and a computing device 306 that are interconnected and communicate with one another on a network 307, such as an ethernet network. The computing device 306 includes magnetic disc media 308 for storage of data that the computing device 306 receives from the computing device 302.

The computing device 302 includes software applications 310 and installed file system 312. When data is to be stored from the software application 310, the installed file system 312 begins interacting with a manager module 314 of the computing device 304. The manager module 314 includes storage policies 316, creation tools 318, and a master map 320. In this embodiment, when the software application is directed to stored data, the data is sent to the installed file system and then the manager module 314 examines the storage policies 316 to determine the appropriate location for storage of the data. The master map 320 includes further information for directing the data to be sent to the computing device 306 where a media module 322 receives the data and the data is then stored in the appropriate storage media. A data index 324 in the media module 322 contains still further information regarding the location to store the data. From computing device 306, the data may be stored in the magnetic disc media 308 or an optical media 326.

The master map 320 may direct the data to be stored in a computing device 328, rather than the computing device 306. In the event that data is to be stored in the computing device 328, a media module 330 determines exactly where the data is to be stored and updates a data index 332 when the data is stored in one of the storage media such as the optical media 326 or a magnetic tape media 334.

The master map 320 could also send the data to a computing device 336 where a media module 338 determines that the data will be placed at a different location and this information is updated in a data index 340 before the data is finally sent to other storage 342.

As illustrated in FIG. 3, the computing device 302 is used to store data from the software applications 310 in one of multiple storage locations. Of course, the storage media 308, 326, 334, and 342 could be located in other arrangements than as distributed between the computing devices 306, 328, 336. As those skilled in the art will understand upon viewing this disclosure, a manager module does not necessarily have to be located in the computing device 304, but, as illustrated in dashed lines, a manager module 344 could replace or supplement the manager module 314. Likewise, a manager module 346 illustrated in dashed lines could also replace or supplement the other manager modules 314 and 344. The media modules 322, 330, and 338 could also be supplemented with a media module 348 shown in dashed lines that would interact with an additional storage media 350, also illustrated in dashed lines. Further as illustrated in dashed lines, the computing device 304 could include a media module 352 that interacts with a storage media 354.

Figure 4:
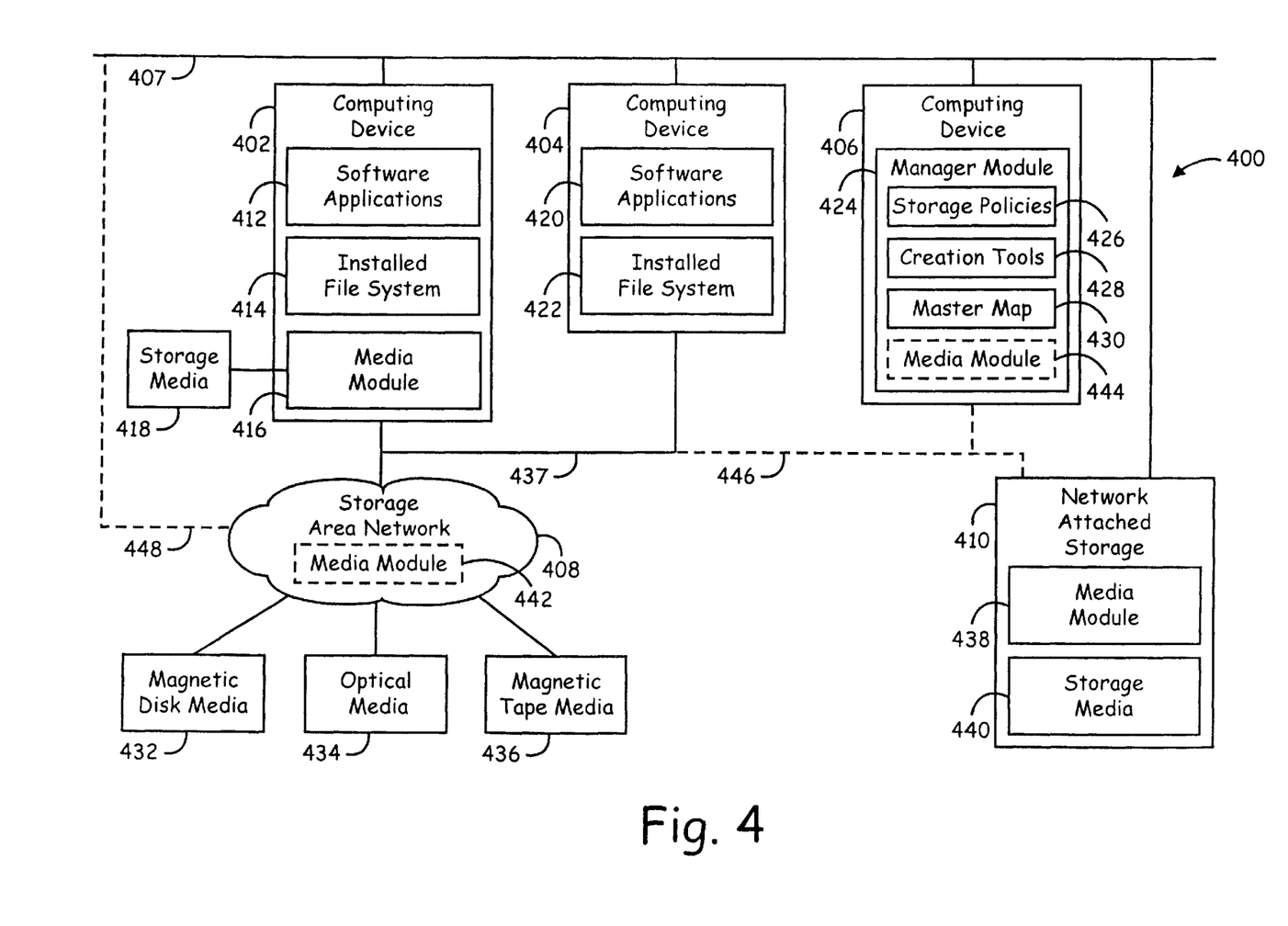
FIG. 4 is a block diagram of another exemplary storage system that illustrates another embodiment of the storage system of FIG. 1.

FIG. 4 is a block diagram of another exemplary storage system 400 that illustrates another embodiment of the storage system 100. The storage system 400 includes computing devices 402, 404, and 406, which communicate across network 407. Each of the computing devices 402, 404, and 406 communicate with a storage area network 408 and a network attached storage 410. The computing device 402 includes software applications 412 that communicate with an installed file system 414. The installed file system 414 communicates with a media module 416. In the event that the software applications 412 desire to store data, the data is transmitted through the installed file system 414 and to the media module 416. At the media module 416, the decision is made whether to send the data to the storage area network 408 or the network attached storage 410, or to some other location, such as storage media 418.

The computing device 404 illustrates a different configuration of a computing device and includes software applications 420 which communicate directly with an installed file system 422. When determining where the data is to be stored in the storage system 400, the installed file system 422 may communicate with the computing device 406. The computing device 406 includes a manager module 422 which includes storage policies 426, creation tools 428, and a master map 430. Based on the data that is to be stored, the installed file system 422 receives instructions from the manager module 424. The manager module 424 provides instructions that are at least based on the storage policies 426 and the master map 430. When the installed file system 422 has received instructions for where to store the data, the data is passed to the appropriate storage mechanism.

The storage area network 408 manages storage of data on a magnetic disk media 432, an optical media 434, and a magnetic tape media 436. Of course, storage area network 408 is an exemplary storage area network and could manage storage of data on numerous other types of storage media. The storage area network 408 communicates with the computing devices 402 and 404 via a high speed fiber network 437.

When the data is to be stored at the network attached storage 410, the installed file system 422 sends the data to the network attached storage 410 where a media module 438 directs the storage of the data at storage media 440. The storage media 440 represents one or more potential storage media that may be accessible for storage of the data.

As illustrated, in dashed lines, transmission of the data may occur in multiple paths. For example, a media module 442 may be present in the storage area network 408 or a media module 444 may be included in the manager module 424. In the event that the manager module 424 includes the media module 444, the fiber network 437 could be expanded as illustrated in dashed lines 446. In addition, the network 407 could be expanded to communicate directly with the storage area network 408 as illustrated by dashed line 448.

Figure 5:
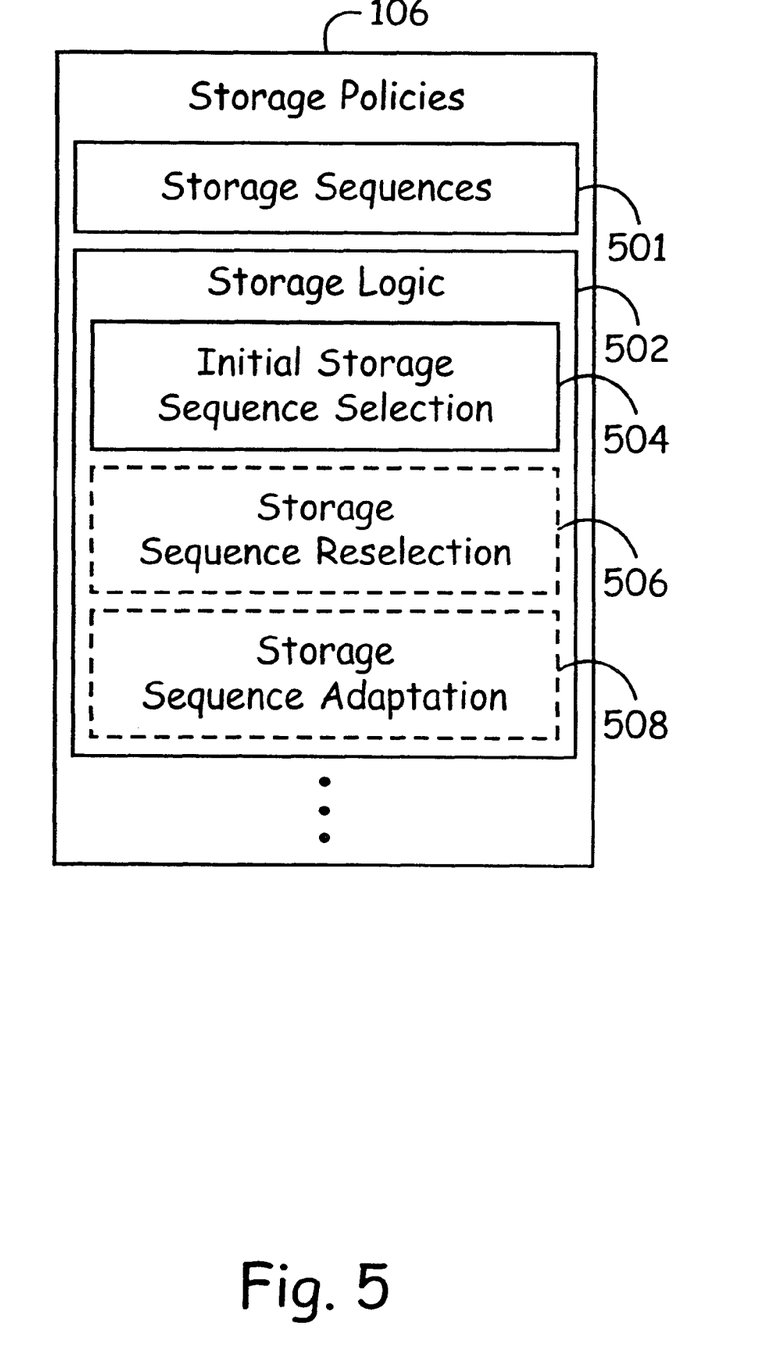
FIG. 5 is a block diagram of exemplary storage policies as illustrated in FIG. 1.

FIG. 5 is a block diagram of exemplary storage policies 106. The storage policies 106 include storage sequences 501 and storage logic 502. The storage sequences 501 represent potential storage patterns which may be used to store particular types of data. The storage logic 502 includes initial storage sequence selection 504, which represents potential storage considerations for the data when it arrives at the storage control 104. Represented in dash lines is storage sequence reselection 506 and storage sequence adaptation 508. The storage sequence reselection 506 represents logic which would allow alternative sequence selection logic to be used in place of the initial storage sequence selection 504. Although not required, a storage sequence reselection 506 would occur when the initial storage sequence selection 504 is inappropriate for the data that is being transmitted from the software application 102. The storage sequence adaptation 508 represents logic that would enable the initial storage sequence selection 504 to be modified according to changes in the data that is being saved in the storage mechanisms.

Figure 6:
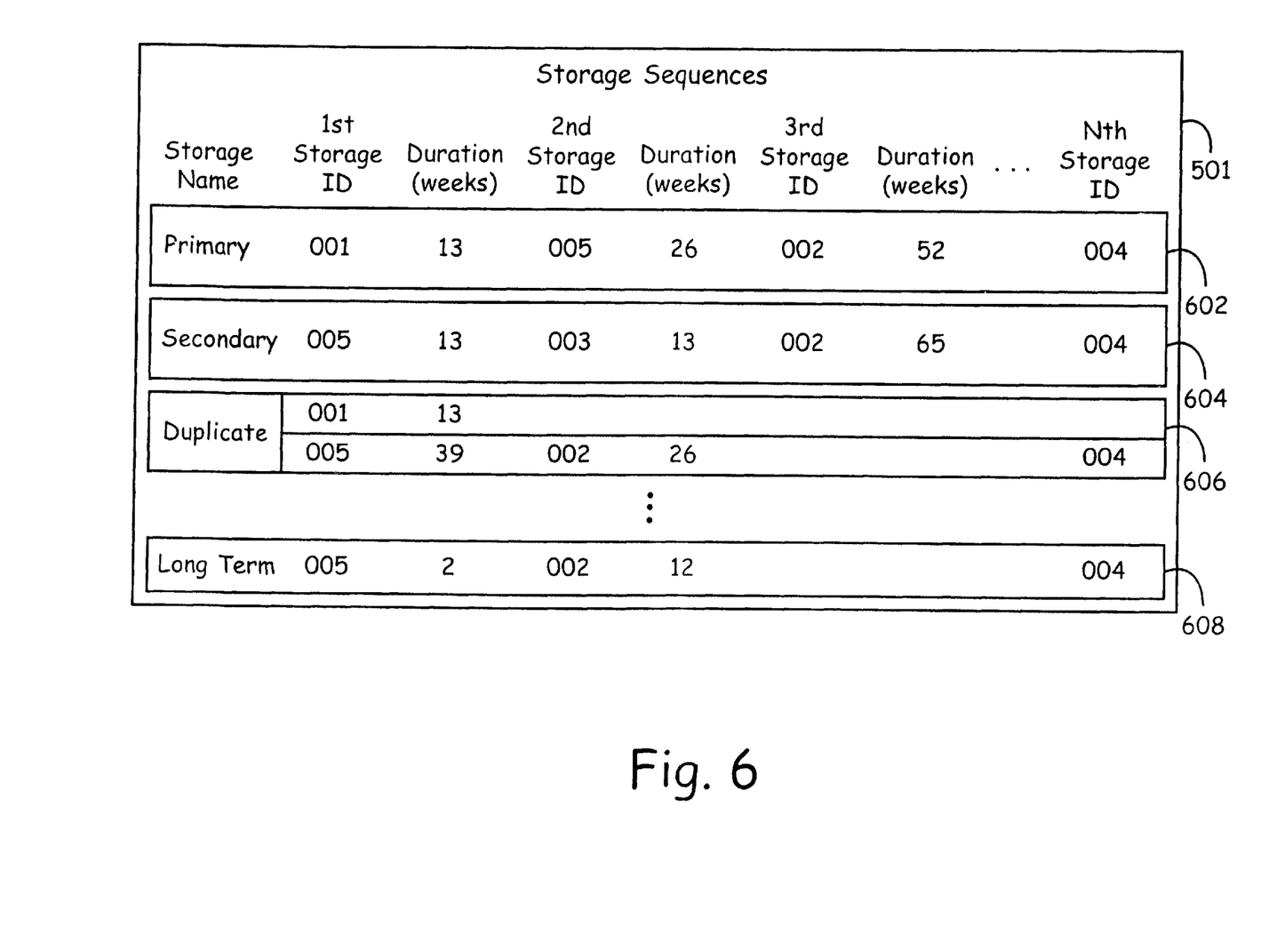
FIG. 6 is a block diagram of exemplary storage sequences in greater detail than as illustrated in FIG. 5.

FIG. 6 is a block diagram of exemplary storage sequences 501. The storage sequences 501 include a primary storage sequence 602, a secondary storage sequence 604, a duplicate storage sequence 606, and a long term storage sequence 608. It should be noted that these are exemplary storage sequences only, and numerous other storage sequences could be added to the storage sequences 501. The storage sequences 501 are arranged in rows with columns to illustrate the different storage sequence characteristics. The far left column illustrates the storage sequence name followed by a first storage I.D. in the second column. For example, if the applications 102 are directing the storage of data, the storage control 104 would look to the storage policies 106. A default storage policy may include storing the data to the primary storage sequence 602 where the data would enter the first storage having an I.D. of 001. The data would be stored at the first storage I.D. for 13 weeks as indicated in the next column of the storage sequences 501. At this point the data would be moved to a second storage I.D. 005 where it would be stored for a duration of 26 weeks. After 26 weeks, the data would be moved to a third storage I.D. 002 for a duration of 52 weeks. This process would continue until the data is stored in an Nth storage I.D. 004. The primary storage sequence 602, of course, is an exemplary storage sequence, but is explained here as a means to understanding operations of the storage sequences 501. As can be seen from FIG. 6, the other storage sequences operate in a similar manner. Of particular note is the duplicate storage sequence 606.

In the duplicate storage sequence 606, data is received at the storage control 104 where it is determined that the data should be copied to two separate storage locations, which are represented in the first storage I.D. column as 001 and 005. The 001 storage I.D. has been directed to store the data for 13 weeks, and then the data may be deleted. The data in the storage having I.D. 005 is directed to be stored for 39 weeks where it will then be moved to a second storage I.D. of 002 for a duration of 26 weeks, after which it will be moved to the nth storage I.D. 004.

Figure 7:
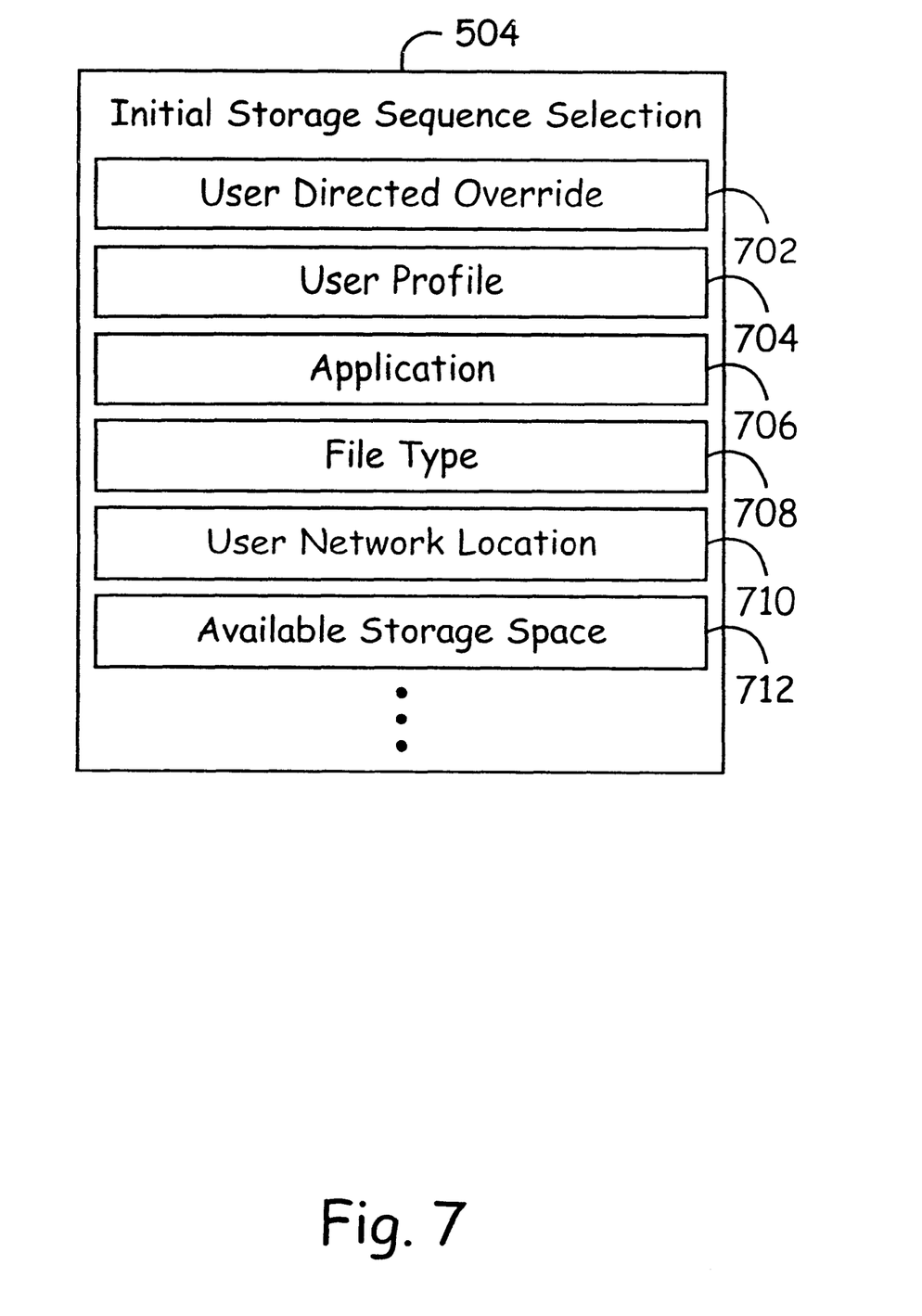
FIG. 7 is a block diagram of the initial storage sequence selection illustrated in greater detail than in FIG. 5.

FIG. 7 is a block diagram of the initial storage sequence selection 504. The initial storage sequence selection 504 is comprised of a number of elements that may be used to determine which of the storage sequences 501 that will be used to store the current data. A default initial storage sequence selection is selected for the storage system 100, and the default is comprised of a particular arrangement of factors such as a user directed override 702, a user profile 704, an application 706, a file type 708, a user network location 710, an available storage space 712, . . . . The user directed override 702 represents the situation where a user chooses to implement particular storage sequence rather than the default storage sequence that would be used if the default storage policies were used. The user profile 704 represents logic that would decide which storage sequence to use based on the type of user, e.g., if the user is a manager, a certain storage sequence would be used, whereas a secretary may require a modified storage sequence. The application 706 that the data is generated from could also play a factor in which storage sequence to use, e.g., if the data was generated from a word processing application, one storage sequence could be selected, whereas if a video application generated the data, a different storage sequence could be selected. The file type 708 is commonly the most important factor in determining which storage sequence to use for the data that is received at the storage control 104. The user network location 710 could play a factor in which storage sequence to use, e.g., if the user is located near a particular storage device, one storage sequence may be desired over another storage sequence. The available storage space 712 could affect where data is to be stored if the default storage sequence requires that data be stored in a storage space that is reaching capacity and another storage space would be desirable because of extra space.

Figure 8:
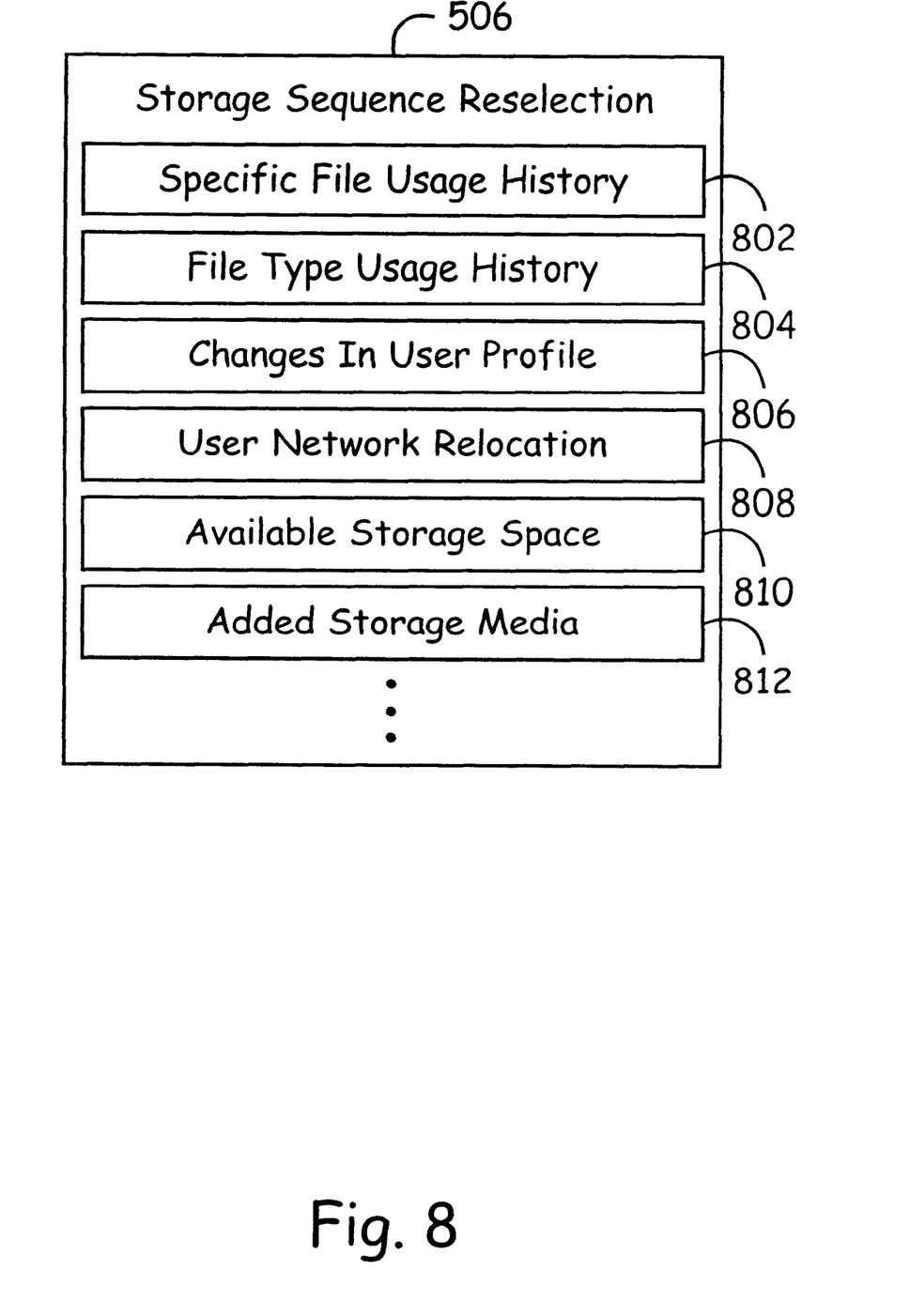
FIG. 8 is a block diagram of the storage sequence reselection illustrated in greater detail than in FIG. 5.

FIG. 8 is a block diagram of the storage sequence reselection 506. The storage sequence reselection 506 represents the factors that would be pertinent to selecting a new storage sequence for storage of data in the storage system 100. For example, if specific file usage history 802 shows that the data should be stored in a different storage sequence, the storage sequence reselection 506 allows the new selection of a storage sequence. The file type usage history 804, e.g., the access history of word documents, is another factor which may require a new storage sequence to be used in the storage system 100. Changes in user profile 806 are another reason for changing the storage sequences of the default system. Another factor for changing the default storage sequences is user network relocation 808. Still other factors include the available storage space 810 and added storage media 812. Of course, these are exemplary and additional factors could be added to the storage sequence reselection 506.

Figure 9:
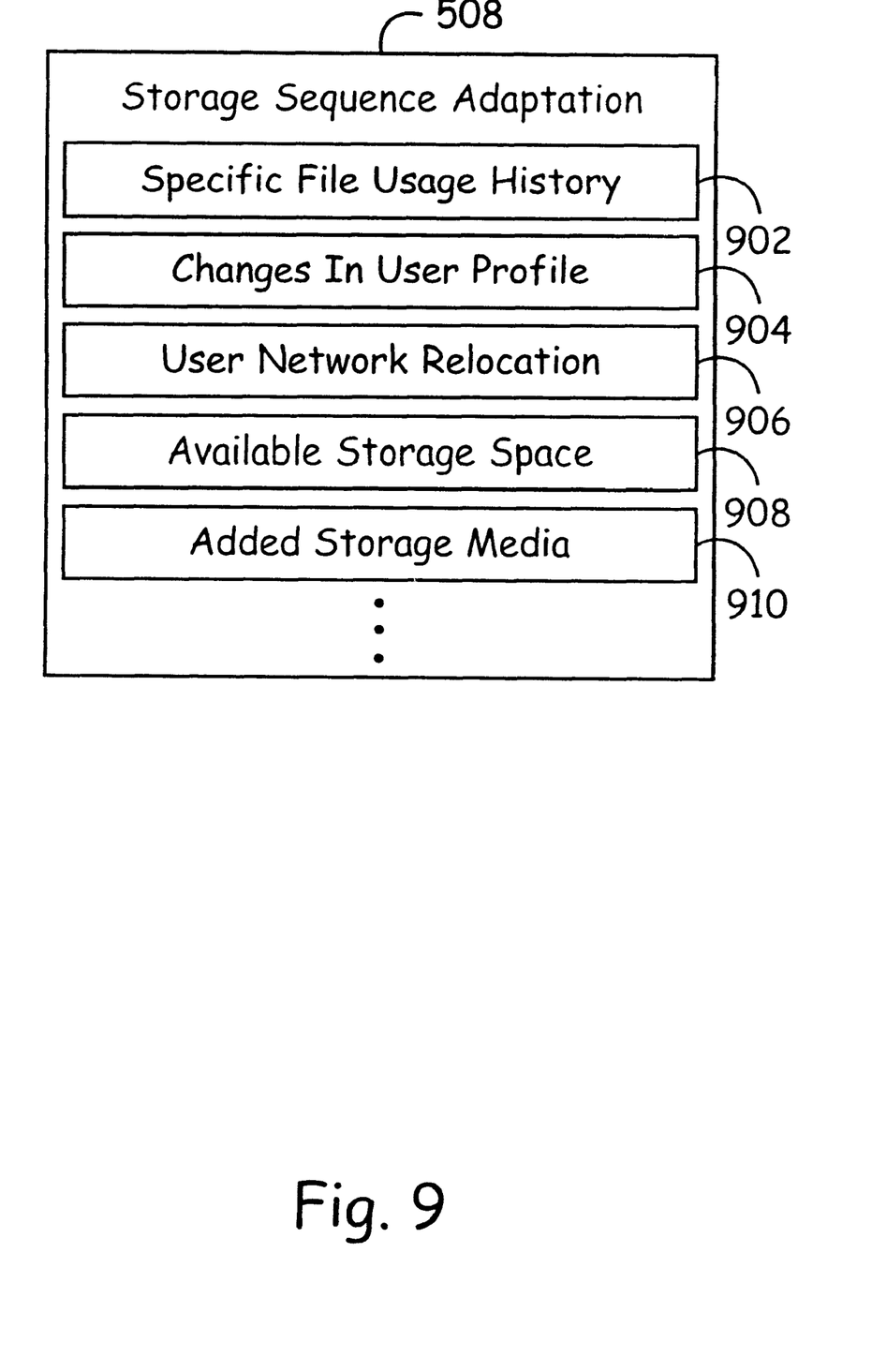
FIG. 9 is a block diagram of the storage sequence adaptation illustrated in greater detail than in FIG. 5.

FIG. 9 is a block diagram of the storage sequence adaptation 508. Like the storage sequence reselection 506, the storage sequence adaptation 508 is illustrated having exemplary reasons for adapting the storage sequences that in the default storage control 104. A specific file usage history 902 could be a reason for changing a storage sequence, such as the primary storage sequence 602 having a greater duration for the first storage I.D. Changes in user profile 904 can also be a reason to adapt the storage sequences. Other factors for changing the storage sequences include user network relocation 906, available storage space 908, and added storage media 910.

What is claimed is:

1. A computer storage system comprising:
   a processor that supports operation of at least one software application that can be utilized to generate data that is stored in the computer storage system;
   at least one storage media for storing selected data from the data that is generated;
   a plurality of storage policies, each one of the plurality of storage policies including directions that the processor must follow for storage of data on the at least one storage media; and
   a storage control that interacts with the at least one software application of the processor to select one of the plurality of storage policies and to determine, according to the selected one of the plurality of storage policies, which of the at least one storage media to use for storage of the selected data.

2. The computer storage system of claim 1 wherein the at least one storage media comprises a plurality of storage media that are selected from the group consisting of magnetic tape media, magnetic disk media, and optical medial.

3. The computer storage system of claim 1 wherein the storage control comprises a manager module that interacts with a media module to compile an index to track the location of the selected data in the at least one storage media.

4. The computer storage system of claim 1 wherein the storage control is configured to migrate the selected data among the at least one storage media according to the selected one of the plurality of storage policies.

5. The computer storage system of claim 1 wherein the plurality of storage policies are selected from the group consisting of storage sequences, storage logic, initial storage sequence selection criteria, storage sequence reselection criteria, and storage sequence adaptation criteria.

6. The computer storage system of claim 5 wherein the initial storage sequence selection criteria are selected from the group consisting of user directed override, user profile, application, file type, user network location, and available storage space.

7. The computer storage system of claim 5 wherein the storage sequence reselection criteria are selected from the group consisting of specific file usage history, file type usage history, user profile, user network relocation, available storage space, and added storage media.

8. The computer storage system of claim 5 wherein the storage sequence adaptation criteria are selected from the group consisting of specific file usage history, user profile, user network relocation, available storage space, and added storage media.

9. A computer storage system comprising:

a processor that supports operation of at least one software application in order to store selected data in the computer storage system;

at least one storage media for storing the selected data;

a plurality of storage policies, each having particular storage guidelines, that are available to determine how data is to be stored in the computer storage system; and a storage control that interacts with the at least one software application of the processor to determine which of the plurality of storage policies to use for storage of the selected data and that stores the selected data according to the selected storage policy.

10. The computer storage system of claim 9 wherein the storage control migrates the selected data from one of the at least one storage media to another of the at least one storage media according to the selected storage policy.

11. A method for storing data on one of a plurality of storage media of a computer storage system according to one of a plurality of storage policies that are defined by a user, the method comprising:

directing a software application to store selected data;

examining the selected data for particular characteristics;

selecting a particular storage policy that matches the particular characteristics of the selected data; and storing the selected data on a storage media of the computer storage system according to the particular storage policy.

12. The method of claim 11 further comprising migrating the selected data among the plurality storage media according to the particular storage policy.

* * * * *